United States Patent
Wang et al.

(10) Patent No.: US 12,254,355 B2
(45) Date of Patent: Mar. 18, 2025

(54) METHOD, ELECTRONIC DEVICE, AND COMPUTER PROGRAM PRODUCT FOR TASK SCHEDULING

(71) Applicant: EMC IP Holding Company LLC, Hopkinton, MA (US)

(72) Inventors: Long Wang, Beijing (CN); Shuguang Gong, Beijing (CN); Chong Yuan, Huilongguan (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 552 days.

(21) Appl. No.: 17/530,997

(22) Filed: Nov. 19, 2021

(65) Prior Publication Data

US 2023/0096015 A1    Mar. 30, 2023

(30) Foreign Application Priority Data

Sep. 30, 2021  (CN) .......................... 202111161588.5

(51) Int. Cl.
   *G06F 9/50*    (2006.01)
(52) U.S. Cl.
   CPC .................. *G06F 9/5027* (2013.01)
(58) Field of Classification Search
   None
   See application file for complete search history.

(56) References Cited

U.S. PATENT DOCUMENTS

| | | | |
|---|---|---|---|
| 5,303,369 A * | 4/1994 | Borcherding | G06F 9/4887 718/107 |
| 11,561,826 B1 * | 1/2023 | Nagpal | G06N 3/063 |
| 2007/0156928 A1 * | 7/2007 | Raghunandan | G06F 9/526 709/251 |
| 2008/0235693 A1 * | 9/2008 | Proctor | G06F 9/4881 718/103 |
| 2011/0296420 A1 * | 12/2011 | Pegushin | G06F 11/3404 718/102 |
| 2013/0061233 A1 * | 3/2013 | Zhou | G06F 9/4881 718/103 |
| 2015/0067691 A1 * | 3/2015 | Johnson | G06F 9/5027 718/103 |
| 2018/0165123 A1 * | 6/2018 | Gutierrez | G06F 9/5005 |
| 2021/0165693 A1 * | 6/2021 | Durvasula | G06F 9/5027 |

* cited by examiner

*Primary Examiner* — Charles E Anya
(74) *Attorney, Agent, or Firm* — WOMBLE BOND DICKINSON (US) LLP

(57) ABSTRACT

A method for task scheduling includes, if it is determined that there is an idle task scheduling token, causing a first computing resource in a computing system to acquire the idle task scheduling token as a first task scheduling token to execute a first task in a task queue. If it is determined that a second task having a higher priority than the first task is to be executed, the first computing resource is to discard the first task scheduling token to switch from executing the first task to executing the second task. If it is determined that the execution of the second task is finished, the first computing resource is to retrieve the first task scheduling token to continue the execution of the first task.

18 Claims, 3 Drawing Sheets

METHOD, ELECTRONIC DEVICE, AND COMPUTER PROGRAM PRODUCT FOR TASK SCHEDULING

CROSS-REFERENCE TO RELATED APPLICATION

This patent application claims priority, under 35 U.S.C. § 119, of Chinese Patent Application No. 202111161588.5, filed Sep. 30, 2021, which is incorporated by reference in its entirety.

TECHNICAL FIELD

Embodiments of the present disclosure relate to the field of computers, and more particularly, to a method, an electronic device, and a computer program product for task scheduling.

BACKGROUND

A task scheduler plays a very important role in a computing system, which is responsible for scheduling asynchronous tasks from most key components. Generally, a computing system uses kernel customization to implement task scheduling and maximize the use of computing resources in the system, thus achieving good performance, e.g., deduplication performance. With the development of computing systems, more and more task schedulers are emerging, which do not rely on any kernel customization and show better performance. However, during execution of a task by a computing resource, operations such as sleep, mutex, lock, and read/write may emerge to block the computing resource. Once the computing resource is blocked, another task waiting for execution by a thread will have to wait, which will deteriorate the performance of the computing system.

SUMMARY OF THE INVENTION

Embodiments of the present disclosure provide a solution for managing computing resources.

In a first aspect of the present disclosure, a task scheduling method is provided. The method may include, if it is determined that there is an idle task scheduling token, causing a first computing resource in a computing system to acquire the idle task scheduling token as a first task scheduling token to perform a first task in a task queue, tasks in the task queue being executed respectively based on task scheduling tokens in a pre-created task scheduling token set. The method may further include, if it is determined that a second task having a higher priority than the first task is to be executed, causing the first computing resource to discard the first task scheduling token to switch from executing the first task to executing the second task. In addition, the method may include, if it is determined that the execution of the second task is finished, causing the first computing resource to retrieve the first task scheduling token to continue the execution of the first task.

In a second aspect of the present disclosure, an electronic device is provided, which includes: a processor; and a memory coupled to the processor and having instructions stored therein that, when executed by the processor, cause the electronic device to perform actions including: if it is determined that there is an idle task scheduling token, causing a first computing resource in a computing system to acquire the idle task scheduling token as a first task scheduling token to perform a first task in a task queue, tasks in the task queue being executed respectively based on task scheduling tokens in a pre-created task scheduling token set; if it is determined that a second task having a higher priority than the first task is to be executed, causing the first computing resource to discard the first task scheduling token to switch from executing the first task to executing the second task; and if it is determined that the execution of the second task is finished, causing the first computing resource to retrieve the first task scheduling token to continue the execution of the first task.

In a third aspect of the present disclosure, a computer program product is provided. The computer program product is tangibly stored on a computer-readable medium and includes machine-executable instructions that, when executed, cause a machine to perform any steps of the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical or similar reference numerals generally represent identical or similar components in the example embodiments of the present disclosure. In the accompanying drawings.

DETAILED DESCRIPTION

The principles of the present disclosure will be described below with reference to several example embodiments illustrated in the accompanying drawings.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of additional embodiments." The terms "first," "second," and the like may refer to different or identical objects. Other explicit and implicit definitions may also be included below.

As discussed above, during execution of a certain task in a task sequence by a computing resource such as a thread, operations such as sleep, mutex, lock, and read/write may emerge, making the computing resource have to spin the task being processed and execute the above operations first. Once the thread is blocked, other tasks waiting for execution by the thread will have to wait, which deteriorates the performance of the computing system. In a conventional scheduling design, a scheduling system in a system kernel is configured to check states of all threads and collect the states of the threads (such as available, unavailable, and blocked). If there are not enough available threads, the system kernel will wake up a callback thread in a user-programmable space to create new threads to execute blocked tasks.

The disadvantage of this solution is that a user customization process associated with the system kernel has poor compatibility, and when there are more blocking and contention situations, the conventional task scheduling method does not show good performance.

In order to address, at least in part, the above disadvantages, a novel task scheduling solution is provided in the embodiments of the present disclosure. This solution can optimize the efficiency of task scheduling without relying on the system kernel, thereby improving the performance of the computing system. In other words, by re-designing the system scheduling process, especially creating a token mechanism for computing resources such as threads, current states of the computing resources can be learned more accurately and meticulously, so that computing resources in states such as spun and suspended can be fully utilized when the conditions are met. As a result, even if there is still task blocking, computing resources can be fully utilized, and tasks in a task queue can be executed in time.

Figure 1:
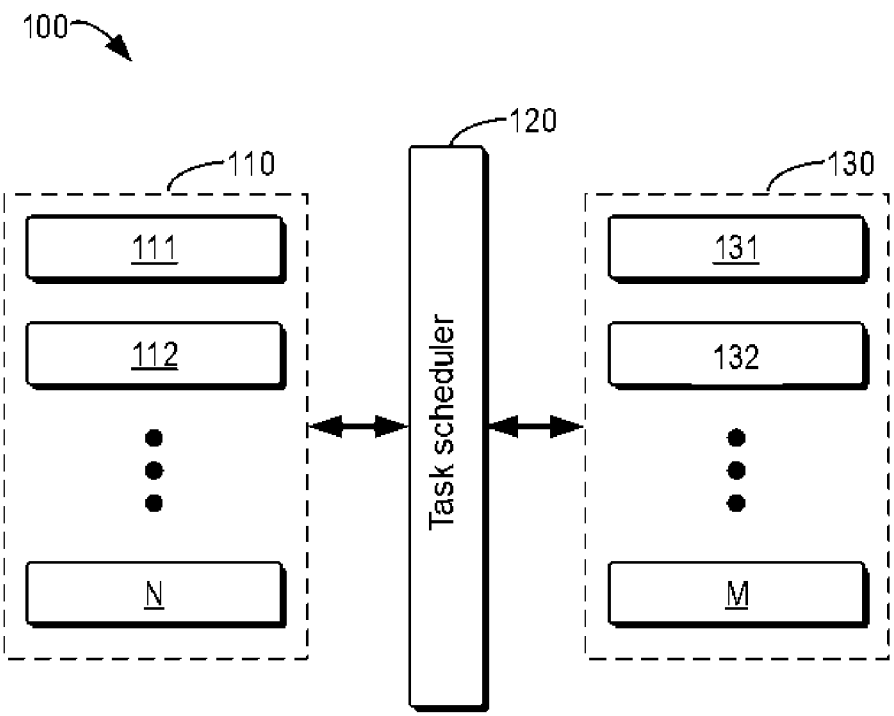
FIG. 1 is a schematic diagram of an example environment according to an embodiment of the present disclosure.

FIG. 1 is a schematic diagram of example environment 100 according to an embodiment of the present disclosure. In example environment 100, a device and/or a process according to embodiments of the present disclosure may be implemented. As shown in FIG. 1, example environment 100 may include computing resource queue 110, task scheduler 120, and task queue 130.

In some embodiments, computing resource queue 110 may include computing resources 111, 112, . . . , N as shown in FIG. 1, and these computing resources may be threads. It should be understood that threads can be created to be scheduled in order so as to execute corresponding tasks.

In some embodiments, task scheduler 120 may be any device or module with a scheduling capability. As a non-limiting example, task scheduler 120 may be any type of fixed computing device, mobile computing device, or portable computing device, including but not limited to, a desktop computer, a laptop computer, a notebook computer, a netbook computer, a tablet computer, a smart phone, and the like. All or part of task scheduler 120 may also be distributed in a cloud.

Figure 2:
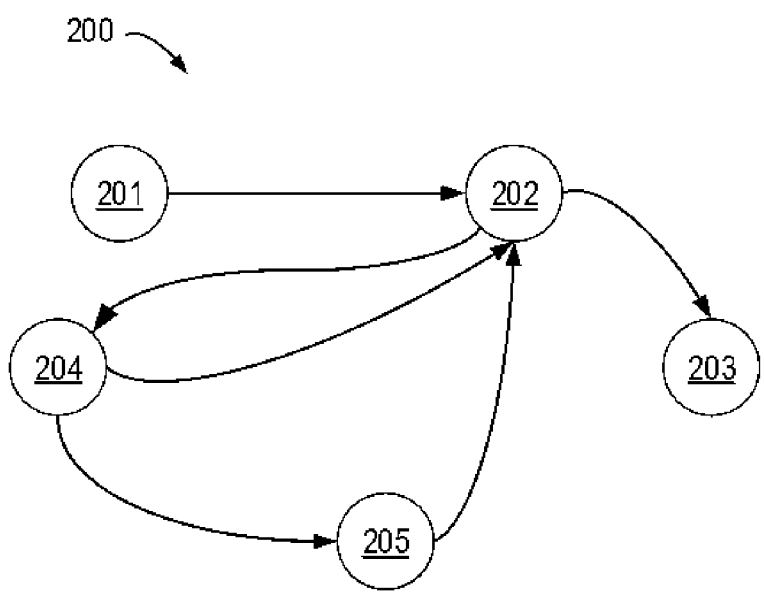
FIG. 2 is a schematic diagram of a task state for task scheduling according to an embodiment of the present disclosure.

In some embodiments, task queue 130 may include tasks 131, 132, . . . , M as shown in FIG. 1. In order to more clearly show various states of a task that may appear in the entire execution cycle, transitions between the various states are described with reference to FIG. 2 first. FIG. 2 is a schematic diagram of task state 200 for task scheduling according to an embodiment of the present disclosure.

As shown in FIG. 2, task state 200 includes at least five states: task initialization state 201, task execution state 202, task completion state 203, task system call state 204, and task pending state 205.

For task initialization state 201, as described above, a computing resource such as threads in computing resource queue 110 is responsible for obtaining an asynchronous task, such as task 131, from task queue 130. Once the task is acquired by the computing resource, the task enters task initialization state 201. In this state, the computing resource can allocate a task structure, an independent stack where the task runs, and an independent scheduler context (including some task execution registers, such as EBP, ESP, and EIP, and other data structures helpful for linking or statistics) for the task. After that, a task context (register) needs to be set to prepare a function entry and stack for the task.

Next, task execution state 202 is entered. At this point, a task context swap is required to save the context (stack, EIP, etc.) of the current thread into the data structure of the thread and move the context of the task to a register of CPU. In this way, it can be ensured that all local data during task execution is saved in a task stack, and the task can be migrated across threads.

If there is no blocking, the task can be directly executed and completed, that is, task completion state 203. At this time, task scheduler 120 can evaluate and report the cost of the task based on parameters such as the execution time of the task, and the threads executing the task can be released.

It should be understood that, during the execution of the task, some function calls, such as pthread_mutex_lock, pthread_cond_wait, sleep, and IO read/write, that may block the running of the threads may emerge. In these cases, the task may be set to enter task system call state 204. Before a task called by the system is actually executed, the thread that is executing the task may be set to give up the token it obtains, and the token may be the thread occupying the CPU thread to execute the corresponding task. The token may be pre-created according to user needs and system performance.

After the task called by the system is completed, the thread returns and tries to retrieve the token it discarded, or the thread may also try to acquire another idle token. If both fail, the thread does not have a token, so it still cannot execute the task. As a result, the task enters task pending state 205. The pending task will exchange context with the current thread to return to the scheduler and save its current context into the data structure of the task. Next, the scheduler queues the pending asynchronous tasks into a pending task queue. Once a thread completes a task assigned to it, the thread can acquire a pending task from the pending task queue, restore its context, and then continue to enter task execution state 202, and then enter task completion state 203.

After the various states of a task are described, a process for task scheduling according to an embodiment of the present disclosure will be described in detail below with reference to FIG. 3. For ease of understanding, the specific data mentioned in the following description are all illustrative and are not intended to limit the scope of protection of the present disclosure. It should be understood that the embodiment described below may also include additional actions not shown and/or may omit actions shown, and the scope of the present disclosure is not limited in this regard.

Figure 3:
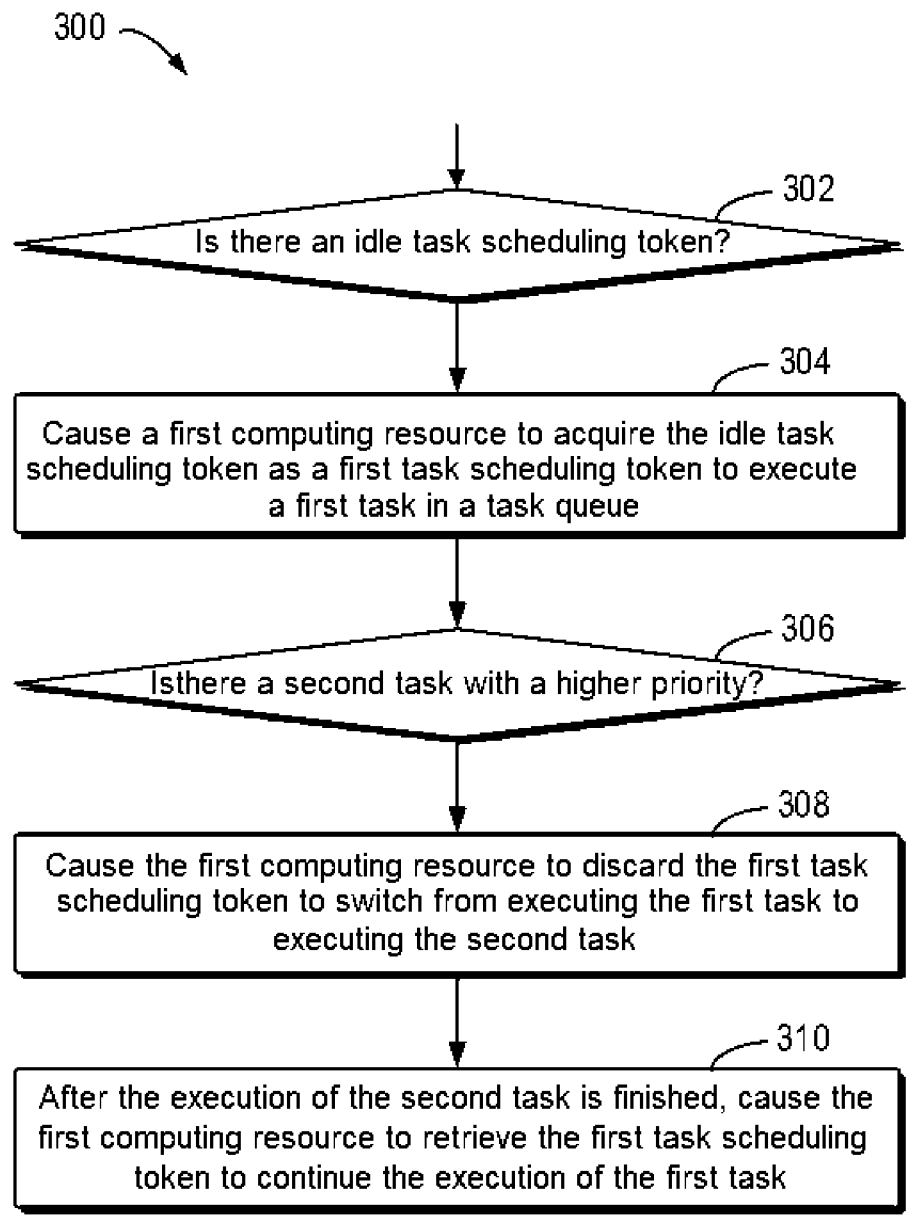
FIG. 3 is a flow chart of a process for task scheduling according to an embodiment of the present disclosure.

FIG. 3 is a flow chart of process 300 for task scheduling according to an embodiment of the present disclosure. In some embodiments, process 300 may be implemented in task scheduler 120 in FIG. 1. Process 300 for task scheduling according to an embodiment of the present disclosure is now described with reference to FIG. 1. For ease of understanding, specific examples mentioned in the following description are all illustrative and are not used to limit the protection scope of the present disclosure.

As shown in FIG. 3, at 302, task scheduler 120 first determines whether there is an idle task scheduling token before allocating a task to a thread. It should be understood that the task scheduling token is a label created by a user that causes a computing resource in a computing system to execute a task in a task queue. In other words, only the thread to which a task scheduling token is allocated is a CPU thread. If there is an idle task scheduling token, the process proceeds to 304.

At 304, task scheduler 120 may enable a first computing resource in a computing system (for example, computing resource 111 in FIG. 1) to acquire the idle task scheduling token as a first task scheduling token to execute a first task in task queue 130 (for example, task 131 in FIG. 1), and tasks in task queue 130 are respectively executed based on task scheduling tokens in a pre-created task scheduling token set. It should be understood that the number of task scheduling tokens in the task scheduling token set is predetermined according to user needs and/or system performance.

In some embodiments, if it is determined that there is no first task 131 or other tasks to be executed in task queue 130, task scheduler 120 may spin the first computing resource. It should be understood that task scheduler 120 may continuously monitor task queue 130. When there is first task 131 or other tasks to be executed in task queue 130, task scheduler 120 may re-enable the first computing resource to execute the corresponding task. The first computing resource has obtained the task scheduling token as described above, and therefore, it can execute the task quickly without waiting, thereby improving the efficiency of task scheduling.

In some embodiments, if it is determined that there is no idle task scheduling token, task scheduler 120 may suspend the first computing resource until there is an idle task scheduling token. It should be understood that suspending and spinning of a thread are slightly different. When a thread that has acquired a task scheduling token is disabled (for example, there is no task), it can be said that the thread is spun, and when a thread that has not acquired a task scheduling token is disabled, it can be said that the thread is suspended.

In the above process, operation tasks with a relatively high priority, such as sleep, mutex, lock, and read/write, may appear at any time. Therefore, at 306, task scheduler 120 needs to determine at any time whether there is a second task with a higher priority than the first task. If there is a second task with a higher priority, the process proceeds to 308.

At 308, task scheduler 120 may cause the first computing resource to discard the first task scheduling token to switch from executing the first task to executing the second task (e.g., task 132 in task queue 130 of FIG. 1). In some embodiments, in order to reasonably use the task scheduling token, task scheduler 120 may re-enable a suspended second computing resource in the computing system to retrieve the discarded task scheduling token.

Alternatively or additionally, in addition to re-enabling the computing resource, an additional computing resource may also be created. As an example, task scheduler 120 may first check whether the total number of computing resources in the computing system is less than a threshold number. If it is determined that the total number of computing resources in the computing system is less than the threshold number, task scheduler 120 may create a third computing resource to retrieve the discarded task scheduling token. Thus, even when the suspended computing resources are insufficient, task processing can be continued by creating a new computing resource.

However, it should be understood that the total number of created computing resources is limited. Therefore, the threshold number may be set to be less than or equal to the sum of the maximum number of computing resources available for executing a third task with a higher priority than the first task (for example, the above system scheduling task) and the number of tokens in the task scheduling token set. As an example, the total number of required computing resources such as threads can be determined according to the following equation:

$$\text{the total number of required threads} = Nmst + Ntt + \text{margin value}.$$

Nmst represents the maximum number of system scheduling threads, Ntt represents the maximum number of task scheduling tokens, and the margin value is any positive integer determined by users.

It should be understood that, in order to ensure system performance, the number of spun computing resources is limited. Therefore, task scheduler 120 is required to determine the total number of spun computing resources in the computing system, and when determining that the total number is greater than a threshold number, suspend the first computing resource until the total number of spun computing resources is less than or equal to the threshold number. Therefore, the threshold number may be set to be less than the number of tokens in the task scheduling token set. As an example, the total number of required computing resources such as threads can be determined according to the following equation:

$$\text{the total number of spun threads} = k*Ntt.$$

where $k<1$ and $k>0$.

At 310, when it is determined that the execution of the second task is finished, task scheduler 120 may cause the first computing resource to retrieve the first task scheduling token, so as to continue the execution of the first task. In some embodiments, if it is determined that the first computing resource does not retrieve the task scheduling token, task scheduler 120 may cause the first computing resource to acquire a second task scheduling token from the task scheduling token set to continue the execution of the first task. The second task scheduling token may be any task scheduling token different from the first task scheduling token in the token set.

It should be understood that if there is no other idle task scheduling token in the task scheduling token set, task scheduler 120 may suspend the first computing resource until there is an idle task scheduling token.

In some embodiments, in order to effectively evaluate the task cost, task scheduler 120 may determine the length of time required to execute the first task based on the start time and end time when the first computing resource is enabled and the time when the first task is spun. The cost of each task can be evaluated after the task is executed, and therefore, it is possible to determine, based on the cost, which computing resource in the computing resource set can preferentially process the next task. In other words, task scheduler 120 can determine or modify, based on the cost of each task, an order in which each computing resource executes the next task. In this way, each computing resource can be used in a reasonable and balanced manner.

In some embodiments, the threads or computing resources described above are operating system threads, and the task scheduling tokens described above are CPU threads.

In addition, it should be understood that the task with a relatively high priority generally refers to a task such as interruption (ISR). In addition, for ordinary asynchronous tasks, a pending task has a higher priority, because the pending task is usually a task interrupted by a system call task such as interruption.

Figure 4:
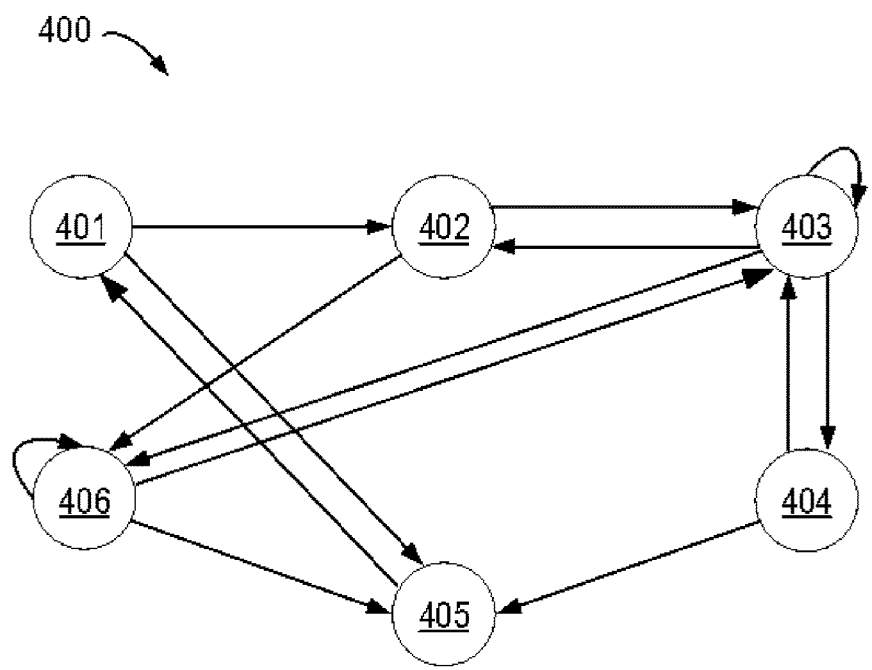
FIG. 4 is a schematic diagram of a thread state for task scheduling according to an embodiment of the present disclosure.

In order to explain the specific process of task scheduling in FIG. 3 in more detail, a schematic diagram of thread state 400 for task scheduling according to an embodiment of the present disclosure is further described with reference to FIG. 4. As shown in FIG. 4, thread state 400 may at least include thread initialization state 401, thread token binding state 402, thread working state 403, thread system call state 404, thread suspended state 405, and thread spun state 406.

As shown in FIG. 4, when a thread as a computing resource is created, the thread enters thread initialization state 401. In this state, the thread will set its associated attributes and add itself to computing resource queue 110. After a data structure of the thread is initialized, it is possible to try to find a task scheduling token from a task scheduling token set. If the task scheduling token can be found, the thread enters thread token binding state 402.

In thread token binding state 402, the thread obtains a token of an asynchronous task in a global task running queue. If the task queue includes a task to be processed, the thread may enter thread working state 403, so that the thread can execute the task. It should be understood that when the task is completed, the thread may enter thread token binding state 402 again, and continue to obtain a task to be processed from the task queue and enter thread working state 403.

As described above, in the process of executing a task, if a task with a higher priority such as a system call task is received, the thread enters thread system call state 404. In this state, the thread will discard the task scheduling token, and then try to notify another thread in the thread queue to obtain the task scheduling token, so as to continue the execution of the task in the task queue. As an example, a suspended thread may be re-enabled, or a new thread may be created. In addition, when the system call task is completed, the thread may first try to reacquire the task scheduling token it discarded. If it fails, all task scheduling tokens in the scheduler may be traversed to try to obtain an idle CPU thread. If all fail, the context of its current task needs to be transferred to a thread context, so that the current task is queued into a suspended task queue, and then the thread enters thread suspended state 405. In addition, when it is found that there is no available task scheduling token when the thread is initialized, the thread may enter thread suspended state 405. Correspondingly, if an available task scheduling token is subsequently found, the thread in the suspended state can be awakened or re-enabled, thereby returning to thread initialization state 401.

In addition, when the thread does not obtain a task to be executed from the task queue, the thread may be set to enter thread spun state 406. Thread spun state 406 is a state in which the thread acquires a task scheduling token but does not find a task to be executed. When it is subsequently determined that there is a task to be executed in the task queue, the spun thread will be awakened and try to acquire the task directly from the task queue. At this time, the thread does not need to obtain a task scheduling token again, so the spun thread can execute a task faster than a suspended thread. It should be understood that the higher the number of the spun threads is, the better the task scheduling performance of the system will be. However, too many spun threads may cause serious contention between threads, so it is necessary to determine the total number of spun threads as described above. If the number of spun threads is too large, the redundant spun threads need to be converted to thread suspended state 405.

As described above, by creating task scheduling tokens, the present disclosure adds more thread states, so that each thread can be more finely sensed and controlled, thereby improving the efficiency of task scheduling.

Figure 5:
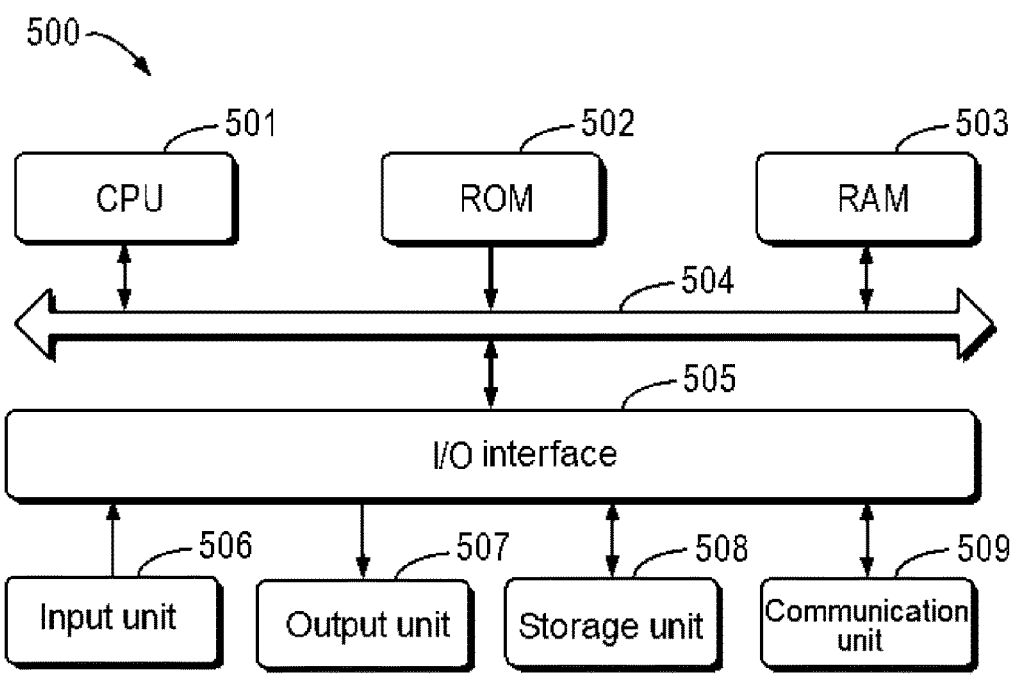
FIG. 5 is a block diagram of an example device that can be used to implement embodiments of the present disclosure.

FIG. 5 is a schematic block diagram of example electronic device 500 that can be used to implement the embodiments of the present disclosure. For example, electronic device 500 may be configured to implement task scheduler 120 as shown in FIG. 1. As shown in the figure, electronic device 500 includes central processing unit (CPU) 501 that may perform various appropriate actions and processing according to computer program instructions stored in read-only memory (ROM) 502 or computer program instructions loaded from storage unit 508 to RAM 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Processing unit 501 performs the various methods and processing described above, such as process 300. For example, in some embodiments, the various methods and processing described above may be implemented as computer software programs or computer program products, which are tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more steps of any process described above may be implemented. Alternatively, in other embodiments, CPU 501 may be configured in any other suitable manners (for example, by means of firmware) to perform a process such as process 300.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A task scheduling method, comprising:
   in response to determining an existence of an idle task scheduling token, causing a first computing resource in a computing system to:
   acquire the idle task scheduling token as a first task scheduling token; and
   perform a first task in a task queue, tasks in the task queue being executed based on task scheduling tokens in a pre-created task scheduling token set;
   in response to determining an existence of a second task to be executed, the second task having a higher priority than the first task, causing the first computing resource to:

discard the first task scheduling token; and
switch from executing the first task to executing the second task;
in response to determining a completion of the execution of the second task, causing the first computing resource to:
retrieve the first task scheduling token; and
continue the execution of the first task; and
in response to determining that a total number of spun computing resources is greater than a first threshold number, suspending the first computing resource until the total number of spun computing resources is less than or equal to the first threshold number, wherein the first threshold number is less than a number of tokens in the task scheduling token set.

2. The task scheduling method of claim 1, further comprising:
in response to determining an unavailability of an idle task scheduling token, suspending the first computing resource until an idle task scheduling token is available.

3. The task scheduling method of claim 1, wherein acquiring the idle task scheduling token to execute the first task comprises:
in response to determining that the first task to be executed does not exist in the task queue, spinning the first computing resource until the first task to be executed exists in the task queue.

4. The task scheduling method of claim 1, further comprising:
in response to determining that the first computing resource has not retrieved the task scheduling token, causing the first computing resource to acquire an idle second task scheduling token from the task scheduling token set to continue execution of the first task; and
in response to determining that the idle second task scheduling token does not exist in the task scheduling token set, suspending the first computing resource until an existence of an idle task scheduling token.

5. The task scheduling method of claim 1, wherein causing the first computing resource to discard the task scheduling token comprises:
re-enabling a suspended second computing resource in the computing system to retrieve the discarded task scheduling token; and
in response to determining that a total number of computing resources in the computing system is less than a second threshold number, creating a third computing resource to retrieve the discarded task scheduling token, wherein the second threshold number is less than or equal to a sum of a maximum number of computing resources available for executing a third task, the third task having a higher priority than the first task and a number of tokens in the task scheduling token set.

6. The task scheduling method of claim 1, further comprising:
determining a length of time required to execute the first task based on a start time and an end time when the first computing resource is enabled and a time when the first task is spun, so as to update a priority of the first computing resource.

7. The task scheduling method of claim 1, further comprising:
in response to determining that the total number of spun computing resources is less than the first threshold number, creating a new computing resource.

8. An electronic device, comprising:
a processor; and
a memory coupled to the processor and having instructions stored therein which, when executed by the processor, cause the electronic device to perform actions comprising:
in response to determining that there is an idle task scheduling token, causing a first computing resource in a computing system to acquire the idle task scheduling token as a first task scheduling token to perform a first task in a task queue, tasks in the task queue being executed respectively based on task scheduling tokens in a pre-created task scheduling token set;
in response to determining that a second task having a higher priority than the first task is to be executed, causing the first computing resource to discard the first task scheduling token to switch from executing the first task to executing the second task; and
in response to determining that the execution of the second task is finished, causing the first computing resource to retrieve the first task scheduling token to continue the execution of the first task;
in response to determining that a total number of spun computing resources is greater than a first threshold number, suspending the first computing resource until the total number of spun computing resources is less than or equal to the first threshold number; and
in response to determining that there is no idle task scheduling token, suspending the first computing resource until there is an idle task scheduling token, wherein the first threshold number is less than a number of tokens in the task scheduling token set.

9. The electronic device according to claim 8, wherein acquiring the idle task scheduling token to execute the first task comprises:
in response to determining that the first task to be executed does not exist in the task queue, spinning the first computing resource until the first task to be executed exists in the task queue.

10. The electronic device according to claim 8, wherein the actions further comprise:
in response to determining that the first computing resource does not retrieve the task scheduling token, causing the first computing resource to acquire an idle second task scheduling token from the task scheduling token set to continue the execution of the first task, wherein if the idle second task scheduling token does not exist in the task scheduling token set, suspending the first computing resource until there is an idle task scheduling token.

11. The electronic device according to claim 8, wherein causing the first computing resource to discard the task scheduling token comprises:
re-enabling a suspended second computing resource in the computing system to retrieve the discarded task scheduling token; and
in response to determining that a total number of computing resources in the computing system is less than a second threshold number, creating a third computing resource to retrieve the discarded task scheduling token, wherein the second threshold number is less than or equal to a sum of a maximum number of computing resources available for executing a third task with a higher priority than the first task and a number of tokens in the task scheduling token set.

12. The electronic device according to claim 8, wherein the actions further comprise:
    determining a length of time required to execute the first task based on a start time and an end time when the first computing resource is enabled and a time when the first task is spun, so as to update a priority of the first computing resource.

13. The electronic device of claim 8, further comprising:
    in response to determining that the first computing resource does not retrieve the idle task scheduling token, causing the first computing resource to acquire a second task scheduling token from the task scheduling token set to continue execution of the first task.

14. A non-transitory computer-readable medium having instructions stored therein, which when executed by a processor, cause the processor to perform actions, the actions comprising:
    in response to determining that there is an idle task scheduling token, causing a first computing resource in a computing system to acquire the idle task scheduling token as a first task scheduling token to perform a first task in a task queue, tasks in the task queue being executed respectively based on task scheduling tokens in a pre-created task scheduling token set;
    in response to determining that a second task having a higher priority than the first task is to be executed, causing the first computing resource to discard the first task scheduling token to switch from executing the first task to executing the second task; and
    in response to determining that the execution of the second task is finished, causing the first computing resource to retrieve the first task scheduling token to continue the execution of the first task;
    in response to determining that a total number of spun computing resources is greater than a first threshold number, suspending the first computing resource until the total number of spun computing resources is less than or equal to the first threshold number; and
    in response to determining that there is no idle task scheduling token, suspending the first computing resource until there is an idle task scheduling token, wherein the first threshold number is less than a number of tokens in the task scheduling token set.

15. The non-transitory computer-readable medium of claim 14, wherein acquiring the idle task scheduling token to execute the first task comprises:
    in response to determining that the first task to be executed does not exist in the task queue, spinning the first computing resource until the first task to be executed exists in the task queue.

16. The non-transitory computer-readable medium of claim 14, wherein the actions further comprise:
    in response to determining that the first computing resource does not retrieve the task scheduling token, causing the first computing resource to acquire an idle second task scheduling token from the task scheduling token set to continue execution of the first task, wherein if the idle second task scheduling token does not exist in the task scheduling token set, suspending the first computing resource until there is an idle task scheduling token.

17. The non-transitory computer-readable medium of claim 14, wherein causing the first computing resource to discard the task scheduling token comprises:
    re-enabling a suspended second computing resource in the computing system to retrieve the discarded task scheduling token; and
    in response to determining that a total number of computing resources in the computing system is less than a second threshold number, creating a third computing resource to retrieve the discarded task scheduling token, wherein the second threshold number is less than or equal to a sum of a maximum number of computing resources available for executing a third task with a higher priority than the first task and a number of tokens in the task scheduling token set.

18. The non-transitory computer-readable medium of claim 14, further comprising:
    in response to determining an absence of tasks in the task queue, causing the first computing resource to enter a thread spun state.

* * * * *